United States Patent
Madden

(10) Patent No.: US 11,216,643 B1
(45) Date of Patent: Jan. 4, 2022

(54) MONITORING OF PET FEEDING WITH VIDEO

(71) Applicant: ObjectVideo Labs, LLC, Tysons, VA (US)

(72) Inventor: Donald Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 393 days.

(21) Appl. No.: 16/360,355

(22) Filed: Mar. 21, 2019

Related U.S. Application Data

(60) Provisional application No. 62/653,227, filed on Apr. 5, 2018.

(51) Int. Cl.
| | | |
|---|---|---|
| *G06K 9/00* | (2006.01) | |
| *G06T 7/73* | (2017.01) | |
| *G08B 25/10* | (2006.01) | |
| *G08B 21/18* | (2006.01) | |

(52) U.S. Cl.
CPC ..... *G06K 9/00201* (2013.01); *G06K 9/00362* (2013.01); *G06T 7/74* (2017.01); *G08B 21/182* (2013.01); *G08B 25/10* (2013.01); *G06T 2207/10016* (2013.01); *G06T 2207/30128* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 2004/0022437 A1* | 2/2004 | Beardsley | .......... | G06K 9/00362 382/199 |
| 2010/0332140 A1* | 12/2010 | Joyce | ................... | A01K 29/005 702/19 |
| 2012/0299731 A1* | 11/2012 | Triener | ................ | G08B 21/182 340/573.1 |
| 2016/0048720 A1* | 2/2016 | Palmer | .................. | G06F 16/434 382/110 |
| 2016/0066546 A1* | 3/2016 | Borchersen | .......... | A01K 11/006 382/110 |
| 2017/0347626 A1* | 12/2017 | Bin | .......................... | A01K 7/02 |
| 2018/0018788 A1* | 1/2018 | Olmstead | ......... | H04N 5/232121 |

* cited by examiner

*Primary Examiner* — Sean M Conner
(74) *Attorney, Agent, or Firm* — Fish & Richardson P.C.

(57) ABSTRACT

Methods, systems, and apparatus, including computer programs encoded on a computer storage medium, for monitoring of pet feeding. The methods, systems, and apparatus include actions of: obtaining a first reference image of a container corresponding to a full state of the container; obtaining a second reference image of the container corresponding to an empty state of the container; obtaining a sample image of the container; based on the first and second reference images, determining an amount of content in the container from the sample image; and based on the amount of the content being less than a reference amount, notifying a user that the amount of the content is getting low.

26 Claims, 8 Drawing Sheets

MONITORING OF PET FEEDING WITH VIDEO

CROSS REFERENCE TO RELATED APPLICATIONS

This application claims benefit of U.S. Provisional Application No. 62/653,227, filed on Apr. 5, 2018, titled "Monitoring of Pet Feeding with Video," which is incorporated by reference in its entirety.

TECHNICAL FIELD

This disclosure relates generally to monitoring systems, and more particularly, to monitoring of pet feeding based on images.

BACKGROUND

A monitoring system for a property can include various components including sensors, cameras, and other devices. A user can configure the monitoring system, for example, by placing components and defining monitoring rules for an object.

People may devote their time, attention, and money to care and feed their pets. For instance, pet owners or pet care providers keep food and water bowls for the pets at appropriate levels and monitor consumption of food and water in the bowls.

SUMMARY

Techniques are described for assisting pet care based on monitoring technology. For example, techniques are described for processes determining information related to consumption of contents in a container for pet food or water based on analysis of images captured by an imaging device configured to capture images of the container.

In some implementations, a system may perform an action based on predetermined rules corresponding to information related to consumption of contents. For example, the system may notify a user if remaining food or water in a container is less than a reference level. In some implementations, the system may provide information related to a nutrition state or behavior of a monitored pet.

According to one aspect of the subject matter described in this application, a computer-implemented method includes: obtaining a first reference image of a container corresponding to a full state of the container; obtaining a second reference image of the container corresponding to an empty state of the container; obtaining a sample image of the container; based on the first and second reference images, determining an amount of content in the container from the sample image; and based on the amount of the content being less than a reference amount, notifying a user that the amount of the content is getting low.

Implementations according to this aspect may include one or more of the following features. For example, the method may further include: obtaining a video of the user that is located within a range from the container; determining from the video of the user that the user is no longer located within the range from the container and that the amount of content in the container has increased while the user was located within the range from the container; and in response to determining that the user is no longer located within the range from the container and that the amount of content in the container has increased while the user was located within the range from the container, obtaining a first image of the container after the user is no longer located within the range from the container as the first reference image corresponding to the full state of the container.

In some implementations, the method may further include: obtaining a video of a pet that is located within a range from the container; determining from the video of the pet that the pet approached the container and left the container without consuming the content; and in response to determining that the pet approached the container and left the container without consuming the content, obtaining a second image of the container after the pet left the container as the second reference image corresponding to the empty state of the container.

In some implementations, determining the amount of the content in the container from the sample image may include: based on the first reference image, determining a first reference level of the content corresponding to the full state of the container with respect to a bottom surface of the container; based on the second reference image, determining a second reference level of the content corresponding to the empty state of the container with respect to the bottom surface of the container; and based on the sample image, determining a level of the content in the container relative to at least one of the first reference level or the second reference level.

In some examples, determining the first reference level of the content may include determining a first fiducial marker among a plurality of fiducial markers of the container that are defined at a side surface of the container. Determining the second reference level of the content may include determining a second fiducial marker among the plurality of fiducial markers of the container, and determining the level of the content in the container may include determining a fiducial mark among the plurality of fiducial markers between the first fiducial marker and the second fiducial marker.

In some examples, determining the amount of the content in the container from the sample image may include: comparing a contrast value of the sample image to a reference contrast value of at least one of the first reference image or the second reference image; and determining the amount of the content in the container based on the comparison of the contrast value of the sample image to the reference contrast value of at least one of the first reference image or the second reference image.

In some implementations, the method may further include: obtaining a video of a pet that is located within a range from the container; determining, based on the first reference image and the second reference image, a first amount of content in the container corresponding to the pet approaching the container in the video; determining, based on the first reference image and the second reference image, a second amount of content in the container corresponding to the pet leaving the container in the video; based on a difference of the first amount and the second amount, determining a consumption amount of content that was consumed by the pet; and providing the user of an indication of the consumption amount.

In some examples, providing the user of the indication of the consumption amount may include notifying the user of a consumption pattern comprising at least one of a number of visits that the pet approached and left the container, a consumption amount for each visit, a consumption duration for each visit, or a consumption speed corresponding to a ratio of the consumption amount to the consumption duration for each visit.

In some implementations, the method may further include: obtaining breed information including an average feeding amount of the pet; comparing the consumption amount with the average feeding amount; and providing the user with the consumption amount based on the consumption amount being outside of a preset range from the average feeding amount. In some examples, the method may further include: based on the consumption pattern and the amount of the content in the container, determining a feeding schedule including a period of time to fill the container to the full state with water or pet food; and based on the feeding schedule, providing the user with an estimated time at which the container is predicted to become less than the reference amount.

In some implementations, the method may further include: obtaining assignment information regarding a first container corresponding to a first pet and a second container corresponding to a second pet; obtaining a video of the first pet and the second pet that are located within a range from the first container and the second container, respectively; and based on the video of the first pet and the second pet, determining whether the first pet consumes a first content in the first container and the second pet consumes a second content in the second container according the assignment information.

In some examples, the method may further include, based on a determination that the second pet is positioned within the range from the first container or a determination that the second pet consumes the first content in the first container, activating a sound device, a lighting device, or a sprayer to discourage the second pet from consuming the first content in the first container.

In some implementations, the method may further include: obtaining weight information including at least one of a weight of the container or a weight of a pet that is located within a range from the container; based on a change of the weight information, determining a weight of content that was consumed by the pet; and determining whether the weight of content corresponds to the amount of content determined from the sample image.

Implementations of the described techniques may include hardware, a method or process implemented at least partially in hardware, or a computer-readable storage medium encoded with executable instructions that, when executed by one or more processors, perform operations.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Techniques are described for capturing an image of an animal (e.g., a pet) or a container (e.g., bowls, dishes) for food or water for the animal, and for providing information related to consumption of food or water in the container based on results of video analytics of the captured image.

Figure 1:
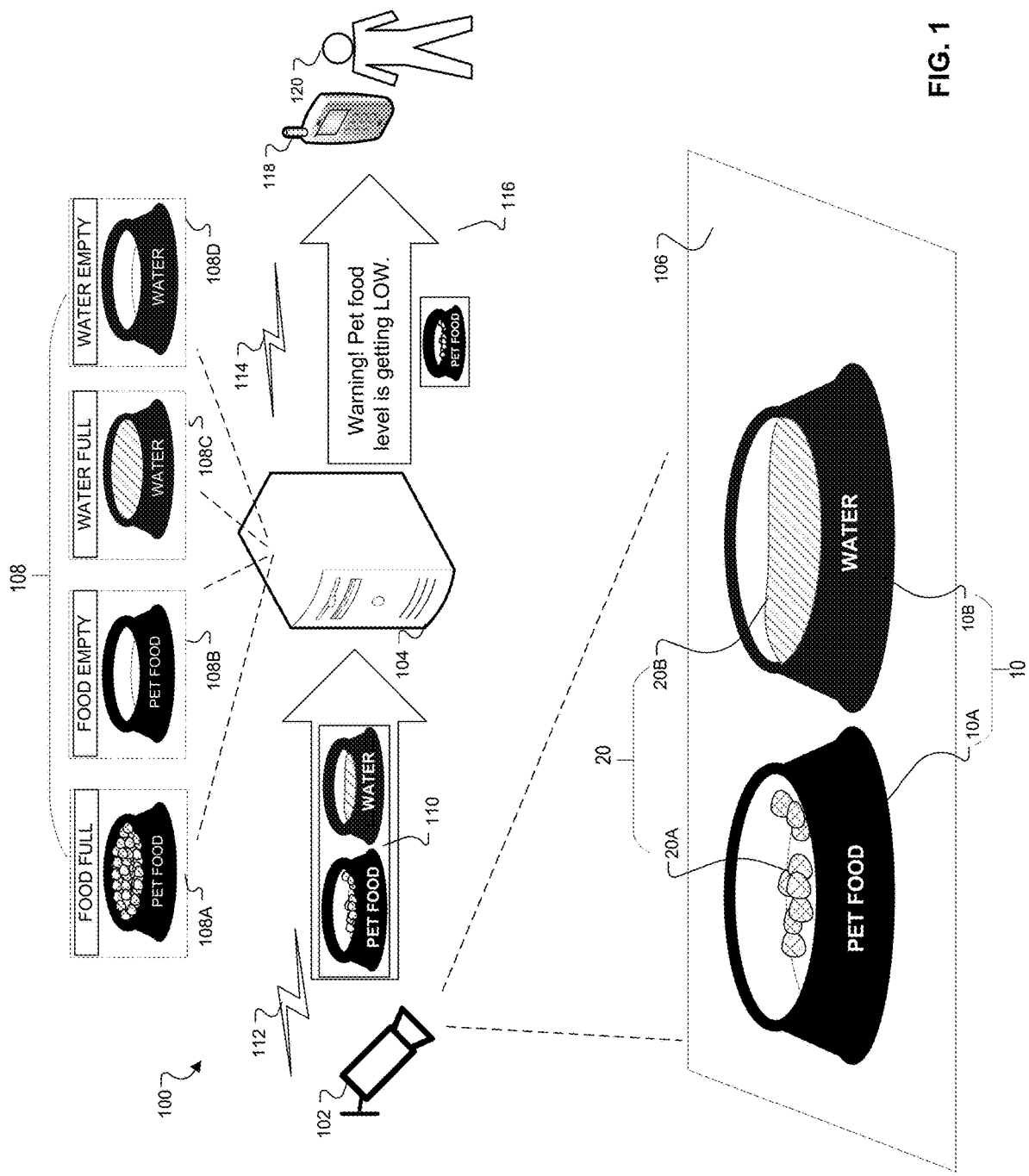
FIG. 1 illustrates an example of a system that monitors pet feeding with a camera.

FIG. 1 illustrates an example of monitoring of pet feeding based on images. A monitoring system 100 includes a camera 102 that captures an image or video of an area 106 of a monitored property and a controller 104 that obtains an image 110 from the camera 102, that processes the image 110, and that provides information 116 to a user 120. The controller 104 may include reference images 108 of a container 10 in the area 106 corresponding to an amount of content 20 in the container 10. The monitoring system 100 further includes communication links 112 and 114 configured to transmit information including images and results of analysis of the images, respectively.

The camera 102 may include various types of imaging devices that can capture an image, images, or a video. For example, the camera 102 may include a still camera, a video camera, a camcorder, an action camera, a stereo camera, a surveillance camera, etc. The camera 102 may be powered by a battery (e.g., a rechargeable battery, a consumable battery), an electrical outlet (e.g., a wall outlet), or both. The camera 102 may pan, zoom, and/or tilt to capture an overall image of an area 106, a portion of the area 106, or objects (e.g., containers 10A, 10B, pets, humans) in the area 106. In some examples, the camera 102 may include a lighting device that assists in capturing of images at low light conditions (e.g., at night, in shade, etc.). In some cases, the lighting device may provide a pet or a user with visibility for the area 106 at the low light conditions.

In some implementations, the camera 102 may be mounted at a position of a property from which an image of the container 10 can be captured. In some examples, the camera 102 may capture images of one or more containers 10A, 10B. For example, the container 10 may include a first container 10A for pet food 20A and a second container 10B for water 20B. In some examples, the camera 102 may be mounted on a wall of a monitored property at a position that is vertically above the first container 10A and the second container 10B. The camera 102 may be positioned to capture images of an internal wall and a bottom surface of the container 10 to detect an amount of content 20 in the container 10. For instance, an amount of pet food 20A in the container 10A may correspond to an area of the internal wall or the bottom surface of the container 10A that is covered by the pet food 20A.

In some implementations, the camera 102 may capture an image 110 that may include at least one of the area 106, the containers 10A, 10B, the contents 20A, 20B, a pet around the containers 10A or 10B, or a user interacting with the containers 10A or 10B. For example, the camera 102 may pan, zoom, and/or tilt to capture the image 110 so that the image 110 includes the containers 10A and 10B. In some examples, the camera 102 may capture an image of one of the containers 10A or 10B at a time, and transmit the image of one of the containers 10A or 10B to the controller 104. In some cases where one or more containers 10A or 10B are misplaced or taken away (e.g., for cleaning or refill), the image 110 may include the area 106 without the containers 10A or 10B.

In some examples, the camera 102 may be spaced apart from the container 10 by a distance to capture an image or video of a pet when the pet consumes (e.g., eats or drinks) the contents 20 in the container 10. For example, the camera 102 may capture images of a head of the pet when the pet drinks water 20B and images of the container 10B before, after, and while the pet drinks water 20B in the container 10B.

In some implementations, the monitoring system 100 may include one or more cameras 102. For example, the one or more cameras 102 may be configured to capture images of multiple containers 10 located at different locations of a monitored property. For example, the one or more cameras 102 may be installed at one or more locations in an indoor area of a monitored property, at one or more locations in an outdoor area of the monitored property, or at any combination thereof. In some cases, each camera 102 may be configured to monitor an assigned container to the respective cameras 102.

The controller 104 may be one or more processors on board of the camera 102, a computer or server in a property, or a cloud server located outside of the property. The controller 104 may obtain images 110 captured by the camera 102, analyzes the images 110, and provides a user 120 with information 116 related to results of analysis of the images 110. For example, the controller 104 may obtain information corresponding to the images 110 over the communication link 112. In some examples, the controller 104 may continuously receive images or video from the camera 102 the communication link 112. In some examples, the controller 104 may obtain the images 110 according to a time interval (e.g., once a day, twice a day, every hour, etc.).

In some implementations, the controller 104 may trigger the camera 102 to capture or transmit images in response to an event or a user request. For example, the controller 104 may determine whether a pet or a user approaches or leave the container 10. The controller 104 may send a control signal over communication link 112 to the camera 102 to obtain images based on a determination that the pet or the user approaches or leaves the container 10. In some cases, the system 100 may include a sensor configured to detect movement of the pet or the user around the container 10. In some examples, the user may request (e.g., through the mobile device 118) to check a current status of the container 10, and in response to the user request, the controller 104 triggers the camera 102 to capture images of the container 10.

The controller 104 processes the images 110 to track the contents 20 in the container 10. For example, the controller 104 compares the images 110 with the reference images 108 to determine an amount of content 20 remaining in the container 10. In some examples, the controller 104 may include one or more reference images 108 corresponding to states of the container 10. For example, the reference images 108A and 108B correspond to a full state and an empty state of the container 10A that is configured to receive pet food, respectively. Similarly, the reference images 108C and 108D correspond to a full state and an empty state of the container 10B that is configured to receive water, respectively.

The controller 104 may identify the container 10A or 10B from the images 110, and compare the images 110 with corresponding reference images 108A, 108B, 108C, and 108D. For example, the controller 104 may identify the container 10A from the images 110, and compare the images 110 with reference images 108A and 108B to determine an amount of content 20A in the identified container 10A. Based on comparison results, the controller 104 may determine an amount of content 20A remaining in the identified container 10A.

In some implementations, the controller 104 may determine a relative amount of content 20 with respect to a reference state. For instance, the controller 104 may determine a ratio of an amount of content 20 in the container 10 with respect to a reference amount corresponding to a full state from among the reference images 108. For example, the controller 104 may determine the relative amount of content 20 remaining in the container 10 as 100%, 50%, 25%, 10%, 0%, etc. of a full state amount. In some implementations, the controller 104 may associate an amount of content 20 determined from the image 110 to a physical amount (e.g., volume, area). For example, based on a capacity (e.g., 4 cups, 2 cups, ½ gallons, etc.) of the container 10, the controller 104 may estimate an absolute amount (e.g., volume) of content 20 remaining in the container 10 rather than the relative amount of content 20. For example, the controller 104 may estimate the absolute volume of pet food 20A in the container 10A as 2 cups, 1 cup, ½ cups of pet food.

In some implementations, the controller 104 may detect, from the images 110, an event, a frequency of the event, and a duration of the event. For example, the controller 104 may detect a pet from the images 110 that were captured while the pet was eating pet food 20A or drinking water 20B in the containers 10A or 10B, respectively. Based on a detection of the event, the controller 104 may determine a duration of each event and a frequency of the event. For example, the controller 104 records time instants when the pet starts and finishes eating pet food or drinking water, and determines a speed (e.g., 0.5 cups/min, 1 cup/min, 2 cups/min, 1 bowl/day, etc.) of eating or drinking and a frequency of eating or drinking (e.g., once a day, twice a day, etc.).

In some examples, the controller 104 may also detect other events, for example, when a pet approaches an empty container, when the container 10 is refilled, when food or water is spilled (e.g., on the area 106), or when the container 10 is taken away or replaced on the area 106. In some examples, the controller 104 may also detect a user (e.g., a hand of the user) in the image 110 that was captured when the user was taking away the container 10, replacing the container 10 at the area 106, or refilling the container 10 with the contents 20.

Utilizing determined amounts of contents 20 in the container 10 and detected events, the controller 104 may learn a consumption pattern associated with one or more events. The controller may generate pet care information that assists in monitoring pet health or behaviors based on the consumption pattern, and may provide the pet care information to a user 120. For example, the controller 104 may generate a report that includes information such as amounts of food and water that a pet consumes for a period of time (e.g., hourly, daily, monthly, etc.), time instants when the pet tends to each or drink, or a frequency at which the pet tends to eat or drink. The controller 104 may send the report to the user 120 via an email, an instant message, or a call, or may update a website or a native application that is associated with the monitoring system 100.

In some implementations, the system 100 may record an image or video at each visit of the pet to the container 10, and determine an index corresponding to the image or video. In some examples, the user 120 can search the image or video based on the index to review the way the pet was eating or drinking. For example, the index may include parameters such as consumption rate of the pet at each visit, a time instant of each visit, an amount of food or water remaining after each visit, a frequency of visits, etc. In this case, the user 120 may filter the image or video by one or more of the parameters to find out a specific event(s). For instance, the user 120 can find the latest video where the pet was eating at a speed faster than a normal speed for the pet.

In some examples, the controller 104 may collect data including amounts of food or water and a consumption pattern for a period of time to assist a user to determine a feeding schedule that is appropriate for a pet. The period of time may be the course of several days, several weeks, or several months, and even several years. Based on the consumption pattern (e.g., a daily rate of consumption of pet food), the controller 104 may provide prediction information about when the container 10 will be empty. In some examples, the controller 104 may determine an eating habit of a pet based on the consumption pattern, and provide prediction information when the container 10 will need to be filled or checked.

In some implementations, the controller 104 may include one or more rules associated to an amount of content 20 in the container 10 or an event. For example, the user 120 may preset a notification rule when an amount of content 20 in the container is less than or equal to a reference level. As shown in FIG. 1, the controller 104 may send a notification message 116 "A Warning! Pet food level is getting LOW," or "Urgent! Pet food EMPTY" to a mobile device 118 of the user 120 to remind the user 120 to refill the corresponding container 10A, 10B, or both. In some examples, the controller 104 may send a notification to a user 120 if the container 10 is expected to be empty in one hour based on a consumption rate per hour. For example, when the controller 104 determines that a pet likely tends to eat at 8 AM every day, the controller 104 may send a notification to a user at 7 AM to fill the container 10.

In some example, the controller 104 may notify the user 120 when a portion of the contents 20 is spilled outside of the container 10 (e.g., on the area 106), or when the container 10 has sat on the area 106 without being taken away or replaced for a period of time greater than a threshold period.

In some implementations, the one or more rules may be set according to other conditions such as a time of day, a presence/absence of a user, or a location of a user. In some examples, the user 120 may set up a method of notification based on such conditions. For example, the user 120 may set up the monitoring system 100 to send a notification via a text message when the user 120 is at the property or within a distance from the property during the day. In other examples, the monitoring system 100 may be configured to send a notification via an email message or to restrict a notification to the user 120 in certain times (e.g., at nights) or when the user 120 is outside of the distance from the property.

Additionally or alternatively, the controller 104 may send the user 120 a sample image or video that shows a current state of the container 10, a pet consuming the contents 20, or the area 106 where the container 10 is placed. In some examples, the controller 104 may provide information regarding a current amount of content 20 in the container 10 to update a website or a native application of the mobile device 118 so that the user 120 may monitor the current state of the container 10 via the website or the native application.

In some implementations, the one or more rules set up at the controller 104 may be related to a behavior of a pet. For example, the controller 104 may detect an abnormal behavior of a pet outside of a consumption pattern observed for a period of time for the pet. For example, the abnormal behavior may include a case when the pet has skipped eating or drinking at a predicted schedule determined based on the consumption pattern, a case when the pet eats or drinks at a different schedule (e.g., more frequently, less frequently, or irregularly) than the predicted schedule, or a case when the pet eats or drinks at a faster or slower rate outside of a predicted rate determined based on the consumption pattern. In some cases, the controller 104 may obtain additional information such as a weight, an age, a gender, and breed information corresponding to the pet from the user 120 or from other sources such as the Internet. The controller 104 may utilize this additional information to determine whether the observed consumption pattern is an abnormal behavior. For example, a fast consumption rate over a certain speed would be dangerous for some breed of pets.

In some examples where the monitoring system 100 monitors multiple pets, the controller 104 may identify the pets from the images 110, analyzes the images 110 per the respective pets, and provide a user with information related to the respective pets. For example, the controller 104 provides a report(s) that includes identification information (e.g., assigned names, characters, numbers, etc.) of the respective pets and eating/drinking behaviors of the respective pets. Additionally or alternatively, the controller 104 may receive identification information from other sources than the images 110. For example, the pets may have an identification tag such as a radio-frequency identification (RFID) tag coupled to their neck collar or ear, and the controller 104 identifies the respective pets based on a detection of the identification tag. In some examples, the controller 104 may also include, in the report, the container 10 from which the respective pets ate or drank, amounts of food or water consumed by the respective pets at each time, or amounts of food or water remaining in the container 10.

Figure 2:
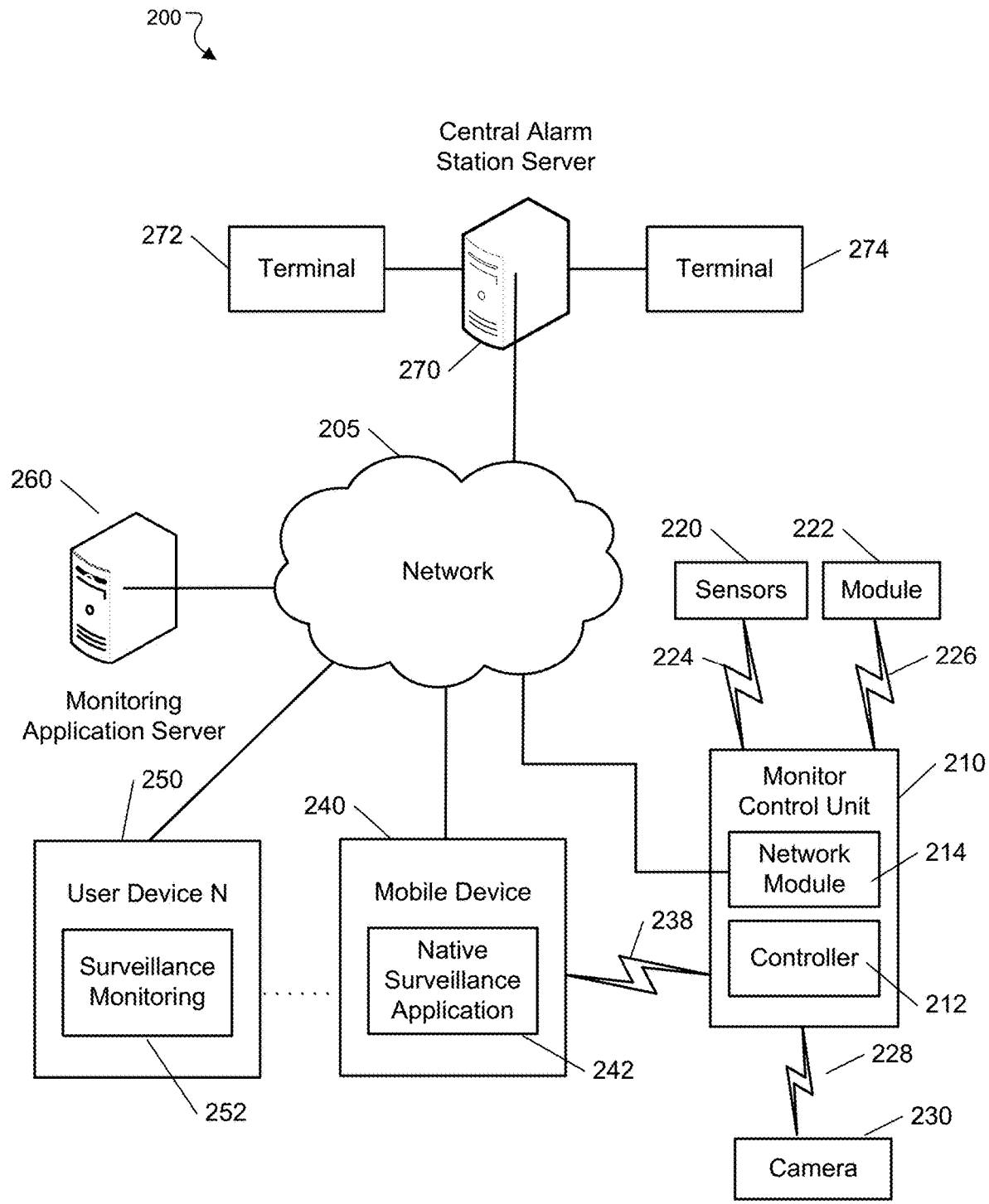
FIG. 2 illustrates another example of a system that monitors pet feeding with a camera.

FIG. 2 illustrates an example of a system 200 configured to provide surveillance, monitoring of pet feeding, and reporting of information related to pet feeding. The system 200 includes a network 205, a monitoring system control unit 210, one or more user devices 240, 250, a monitoring application server 260, and a central alarm station server 270. In some examples, the network 205 facilitates communications between the monitoring system control unit 210, the one or more user devices 240, 250, the monitoring application server 260, and the central alarm station server 270.

The network 205 is configured to enable exchange of electronic communications between devices connected to the network 205. For example, the network 205 may be configured to enable exchange of electronic communications between the monitoring system control unit 210, the one or more user devices 240, 250, the monitoring application server 260, and the central alarm station server 270. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitoring system control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring system control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitoring system control unit 210 includes one or more sensors or detectors. For example, the monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

In some implementations, referring to FIGS. 1 and 2, the sensors 220 may include a weight sensor configured to measure a weight of the container 10 to enhance accuracy in determining an amount of content 20 in the container 10 and in detecting an event related to pet feeding. For example, the area 106 in FIG. 1 where the container 10 is placed may be a mat including a digital pressure sensor or scale that measures a weight of an object (e.g., container 10) located on the mat or a distribution of weight on the mat. In some examples, the weight sensor may detect a location of the object on the mat based on the measured weight or distribution of weight.

In some examples, the monitoring system 200 may include a weight sensor 220 and a camera 230 that monitors multiple containers. In this example, the monitoring system 200 may determine weights of the multiple containers at once. For example, the monitoring system 200 (e.g., control unit 210) may obtain, from the camera 230, an image of the multiple containers of which a first container is empty, and obtain a first reading from the weight sensor 220. Then the control unit 210 may detect, by the camera 230, an event when the first container is taken away, and obtain a second reading from the weight sensor 220. The control unit 210 may further detect, by the camera 230, an event when the first container is returned with full of contents (e.g., pet food, water), and obtain a third reading from the weight sensor 220. Based on differences between the weight readings, the control unit 210 may determine a weight of an empty container (e.g., the first reading—the second reading) and a weight of full content (e.g., the third reading—the first reading).

In some cases, the control unit 210 may determine a volume of content corresponding to the weight of content using a density of content (e.g., 1 g/cm$^3$ for water). The control unit 210 may determine an estimated volume of content utilizing a first volume determined based on analysis of images and a second volume determined based on measured weights. For instance, the estimate volume of content may be a mean value or a median value between the first volume determined based on analysis of images and the second volume determined based on measured weights.

In some implementations, the control unit 210 may detect consumption of contents based on a change of weight measured by the weight sensor 220. For example, the control unit 210 determines, as described above regarding FIG. 1, a type of the content 20B (e.g., water) in the container 10 based on image/video analytics of the images 110, and determines a remaining amount of the content 20B based on a change of weight measured by the weight sensor 220. In some cases, the control unit 210 may determine a rate of consumption based on a decrease of the weight of the content as a pet eats or drinks the contents.

In some implementations, the weight sensor 220 could go where the pets would stand instead of or in addition to under the food container, which would allow the system 200 to weigh the pets each time they come to the bowl and track the weights of the pets along with their food consumption. In some cases, where one sensor is disposed under the pets and not under the containers, the weight measured by the sensor may increase as the pet eats or drinks based on a sensitivity of the sensor. In this way, the system 200 may determine a consumption amount without information regarding a starting weight of food or water in the container.

In some cases, the one sensor may be disposed under the pet and the container (e.g., under a mat). In this case, the weight measured by the sensor may not change as the pet eats or drinks while the pet is on the mat. The system 200 may wait until the pet steps off the mat to determine how much weight is changed from the starting weight of the food or water in the container.

In some implementations, the system 200 may include additional devices such as a time-of-flight (ToF) sensor, a light detection and ranging (LIDAR) sensor, Infrared (IR) sensor, a stereo camera, a Passive Infrared (PIR) sensor, or a light projector, to more accurately detect the presence or locations of objects (e.g., containers, pets, people, pet food, water). For example, PIR sensors may detect a pet or a user that approaches or leaves the container. In some examples, these additional devices may assist installation or calibration of the system 200. For example, the light projector may project a visible pattern on an area or mat where the camera 230 is supposed to monitor, and the system 200 may use the pattern as a reference to determine a mounting position of the camera 230 or adjusting imaging parameters such as a focus distance or a panning range of the camera 230.

The monitoring system control unit 210 communicates with the module 222 and the camera 230 to perform surveillance or monitoring. The module 222 is connected to one or more lighting systems and is configured to control operation of the one or more lighting systems. The module 222 may control the one or more lighting systems based on commands received from the monitoring system control unit 210. For instance, the module 222 may cause a lighting system to illuminate an area to provide a better image of the area when captured by a camera 230.

The camera 230 may be a video/photographic camera or other type of optical sensing device configured to capture images. For instance, the camera 230 may be configured to capture images of an area within a building monitored by the monitoring system control unit 210. The camera 230 may be configured to capture single, static images of the area and also video images of the area in which multiple images of the area are captured at a relatively high frequency (e.g., thirty images per second). The camera 230 may be controlled based on commands received from the monitoring system control unit 210.

The camera 230 may be triggered by several different types of techniques. For instance, a Passive Infra Red (PIR) motion sensor may be built into the camera 230 and used to trigger the camera 230 to capture one or more images when motion is detected. The camera 230 may also include a microwave motion sensor built into the camera and used to trigger the camera 230 to capture one or more images when motion is detected. The camera 230 may have a "normally open" or "normally closed" digital input that can trigger capture of one or more images when external sensors (e.g., the sensors 220, PIR, door/window, etc.) detect motion or other events. In some implementations, the camera 230 receives a command to capture an image when external devices detect motion or another potential alarm event. The camera 230 may receive the command from the controller 212 or directly from one of the sensors 220.

In some examples, the camera 230 triggers integrated or external illuminators (e.g., Infra Red, Z-wave controlled "white" lights, lights controlled by the module 222, etc.) to improve image quality when the scene is dark. An integrated or separate light sensor may be used to determine if illumination is desired and may result in increased image quality.

The camera 230 may be programmed with any combination of time/day schedules, system "arming state", or other variables to determine whether images should be captured or not when triggers occur. The camera 230 may enter a low-power mode when not capturing images. In this case, the camera 230 may wake periodically to check for inbound messages from the controller 212. The camera 230 may be powered by internal, replaceable batteries if located remotely from the monitoring system control unit 210. The camera 230 may employ a small solar cell to recharge the battery when light is available. Alternatively, the camera 230 may be powered by the controller's 212 power supply if the camera 230 is co-located with the controller 212.

The sensors 220, the module 222, and the camera 230 communicate with the controller 212 over communication links 224, 226, and 228. The communication links 224, 226, and 228 may be a wired or wireless data pathway configured to transmit signals from the sensors 220, the module 222, and the camera 230 to the controller 212. The sensors 220, the module 222, and the camera 230 may continuously transmit sensed values to the controller 212, periodically transmit sensed values to the controller 212, or transmit sensed values to the controller 212 in response to a change in a sensed value.

The communication link 228 over which the camera 230 and the controller 212 communicate may include a local network. The camera 230 and the controller 212 may exchange images and commands over the local network. The local network may include 802.11 "WiFi" wireless Ethernet (e.g., using low-power WiFi chipsets), Z-Wave, Zigbee, Bluetooth, "Homeplug," or other "Powerline" networks that operate over AC wiring, or wired Ethernet networks utilizing cables such as a Category 5 (CAT5) or Category 6 (CAT6).

The monitoring application server 260 provides monitoring services by exchanging electronic communications with the monitoring system control unit 210, the one or more user devices 240, 250, and the central alarm station server 270 over the network 205. For example, the monitoring application server 260 may be configured to monitor events (e.g., alarm events) generated by the monitoring system control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240, 250.

In some examples, the monitoring application server 260 may route alarm data received from the network module 214 or the one or more user devices 240, 250 to the central alarm station server 270. For example, the monitoring application server 260 may transmit the alarm data to the central alarm station server 270 over the network 205.

The monitoring application server 260 may store sensor and image data received from the monitoring system and perform analysis of sensor and image data received from the monitoring system. Based on the analysis, the monitoring application server 260 may communicate with and control aspects of the monitoring system control unit 210 or the one or more user devices 240, 250.

The central alarm station server 270 provides alarm monitoring service by exchanging communications with the monitoring system control unit 210, the one or more user devices 240, 250, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitoring system control unit 210 to receive information regarding alarm events detected by the monitoring system control unit 210. The central alarm station server 270 also may receive information regarding alarm events from the one or more user devices 240, 250.

The central alarm station server 270 is connected to multiple terminals 272 and 274. The terminals 272 and 274 may be used by operators to process alarm events. For example, the central alarm station server 270 may route alarm data to the terminals 272 and 274 to enable an operator to process the alarm data. The terminals 272 and 274 may include general-purpose computers (e.g., desktop personal computers, workstations, or laptop computers) that are configured to receive alarm data from a server in the central alarm station server 270 and render a display of information based on the alarm data. For instance, the controller 212 may control the network module 214 to transmit, to the central alarm station server 270, alarm data indicating that a sensor 220 detected a door opening when the monitoring system was armed. The central alarm station server 270 may receive the alarm data and route the alarm data to the terminal 272 for processing by an operator associated with the terminal 272. The terminal 272 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 272 and 274 may be mobile devices or devices designed for a specific function. Although FIG. 2 illustrates two terminals for brevity, actual implementations may include more (and, perhaps, many more) terminals.

The one or more user devices 240, 250 are devices that host and display user interfaces. For instance, the user device 240 is a mobile device that hosts one or more native applications (e.g., the native surveillance application 242). The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media.

The native surveillance application 242 runs on mobile devices platforms, such as iPhone, iPod touch, Blackberry, Google Android, Windows Mobile, etc. The native surveillance application 242 enables the user device 240 to receive and process image and sensor data from the monitoring system.

The user device 250 may be a general-purpose computer (e.g., a desktop personal computer, a workstation, or a laptop computer) that is configured to communicate with the monitoring application server 260 and/or the monitoring system control unit 210 over the network 205. The user device 250 may be configured to display a surveillance monitoring user interface 252 that is generated by the user device 250 or generated by the monitoring application server 260. For example, the user device 250 may be configured to display a user interface (e.g., a web page) provided by the monitoring application server 260 that enables a user to perceive images captured by the camera 230 and/or reports related to the monitoring system. Although FIG. 2 illustrates two user devices for brevity, actual implementations may include more (and, perhaps, many more) or fewer user devices.

In some implementations, the one or more user devices 240, 250 communicate with and receive monitoring system data from the monitoring system control unit 210 using the communication link 238. For instance, the one or more user devices 240, 250 may communicate with the monitoring system control unit 210 using various local wireless protocols such as WiFi, Bluetooth, Zwave, Zigbee, HomePlug (Ethernet over powerline), or wired protocols such as Ethernet and USB, to connect the one or more user devices 240, 250 to local security and automation equipment. The one or more user devices 240, 250 may connect locally to the monitoring system and its sensors and other devices. The local connection may improve the speed of status and control communications because communicating through the network 205 with a remote server (e.g., the monitoring application server 260) may be significantly slower.

Although the one or more user devices 240, 250 are shown as communicating with the monitoring system control unit 210, the one or more user devices 240, 250 may communicate directly with the sensors and other devices controlled by the monitoring system control unit 210. In some implementations, the one or more user devices 240, 250 replace the monitoring system control unit 210 and perform the functions of the monitoring system control unit 210 for local monitoring and long range/offsite communication.

In other implementations, the one or more user devices 240, 250 receive monitoring system data captured by the monitoring system control unit 210 through the network 205. The one or more user devices 240, 250 may receive the data from the monitoring system control unit 210 through the network 205 or the monitoring application server 260 may relay data received from the monitoring system control unit 210 to the one or more user devices 240, 250 through the network 205. In this regard, the monitoring application server 260 may facilitate communication between the one or more user devices 240, 250 and the monitoring system.

In some implementations, the one or more user devices 240, 250 may be configured to switch whether the one or more user devices 240, 250 communicate with the monitoring system control unit 210 directly (e.g., through link 238) or through the monitoring application server 260 (e.g., through network 205) based on a location of the one or more user devices 240, 250. For instance, when the one or more user devices 240, 250 are located close to the monitoring system control unit 210 and in range to communicate directly with the monitoring system control unit 210, the one or more user devices 240, 250 use direct communication. When the one or more user devices 240, 250 are located far from the monitoring system control unit 210 and not in range to communicate directly with the monitoring system control unit 210, the one or more user devices 240, 250 use communication through the monitoring application server 260.

Although the one or more user devices 240, 250 are shown as being connected to the network 205, in some implementations, the one or more user devices 240, 250 are not connected to the network 205. In these implementations, the one or more user devices 240, 250 communicate directly with one or more of the monitoring system components and no network (e.g., Internet) connection or reliance on remote servers is needed.

In some implementations, the one or more user devices 240, 250 are used in conjunction with only local sensors and/or local devices in a house. In these implementations, the system 200 only includes the one or more user devices 240, 250, the sensors 220, the module 222, and the camera 230. The one or more user devices 240, 250 receive data directly from the sensors 220, the module 222, and the camera 230 and sends data directly to the sensors 220, the module 222, and the camera 230. The one or more user devices 240, 250 provide the appropriate interfaces/processing to provide visual surveillance and reporting.

In other implementations, the system 200 further includes network 205 and the sensors 220, the module 222, and the camera 230 are configured to communicate sensor and image data to the one or more user devices 240, 250 over network 205 (e.g., the Internet, cellular network, etc.). In yet another implementation, the sensors 220, the module 222, and the camera 230 (or a component, such as a bridge/router) are intelligent enough to change the communication pathway from a direct local pathway when the one or more user devices 240, 250 are in close physical proximity to the sensors 220, the module 222, and the camera 230 to a pathway over network 205 when the one or more user devices 240, 250 are farther from the sensors 220, the module 222, and the camera 230. In some examples, the system leverages GPS information from the one or more user devices 240, 250 to determine whether the one or more user devices 240, 250 are close enough to the sensors 220, the module 222, and the camera 230 to use the direct local pathway or whether the one or more user devices 240, 250 are far enough from the sensors 220, the module 222, and the camera 230 that the pathway over network 205 is required. In other examples, the system leverages status communications (e.g., pinging) between the one or more user devices 240, 250 and the sensors 220, the module 222, and the camera 230 to determine whether communication using the direct local pathway is possible. If communication using the direct local pathway is possible, the one or more user devices 240, 250 communicate with the sensors 220, the module 222, and the camera 230 using the direct local pathway. If communication using the direct local pathway is not possible, the one or more user devices 240, 250 communicate with the sensors 220, the module 222, and the camera 230 using the pathway over network 205.

In some implementations, the system 200 provides end users with access to images captured by the camera 230 to aid in decision making. The system 200 may transmit the images captured by the camera 230 over a wireless WAN network to the user devices 240, 250. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 230). In these implementations, the camera 230 may be set to capture images on a periodic basis when the alarm system is armed in an "Away" state, but set not to capture images when the alarm system is armed in a "Stay" state or disarmed. In addition, the camera 230 may be triggered to begin capturing images when the alarm system detects an event, such as an alarm event, a door opening event for a door that leads to an area within a field of view of the camera 230, or motion in the area within the field of view of the camera 230. In other implementations, the camera 230 may capture images continuously, but the captured images may be stored or transmitted over a network when needed.

In some implementations, all of the processing described throughout this disclosure may be implemented in a monitoring system control panel located inside the property being monitored, as opposed to sending data to an external server for processing. For example, rather than being a separate server located in a remote location, the monitoring application server 260 may be a logical component inside of the monitoring system control unit 210. In this example, the monitoring system control unit 210 performs the processing of supervising property access without having to send image/video data to a separate server separated by a network.

In other implementations, all of the processing described throughout this disclosure may be performed on a remote server (e.g., monitoring application server 260). In these implementations, the monitoring system control panel (or sensors themselves) may send image/video data to the remote server over a network and the remote server may perform all of supervising property access. For instance, the monitoring system control unit 210 sends all captured image/video data to the monitoring application server 260 and the monitoring application server 260 performs the processing of supervising property access.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the interpretation of image/video data collected relatively recently (e.g., image/video data collected within the past three months) and the remote server may perform the detection of patterns in image/video data collected over a longer period of time (e.g., image/video data collected over the past several years). Alternatively, the monitoring system control panel may perform pre-processing of the image/video data, including collection and aggregation of the image/video data, and the remote server may perform the detailed analysis of detecting patterns within the image/video data. In the example shown in FIG. 2, the processing described throughout this disclosure may be mixed between the monitoring system control unit 210 and the monitoring application server 260.

Figure 3A:
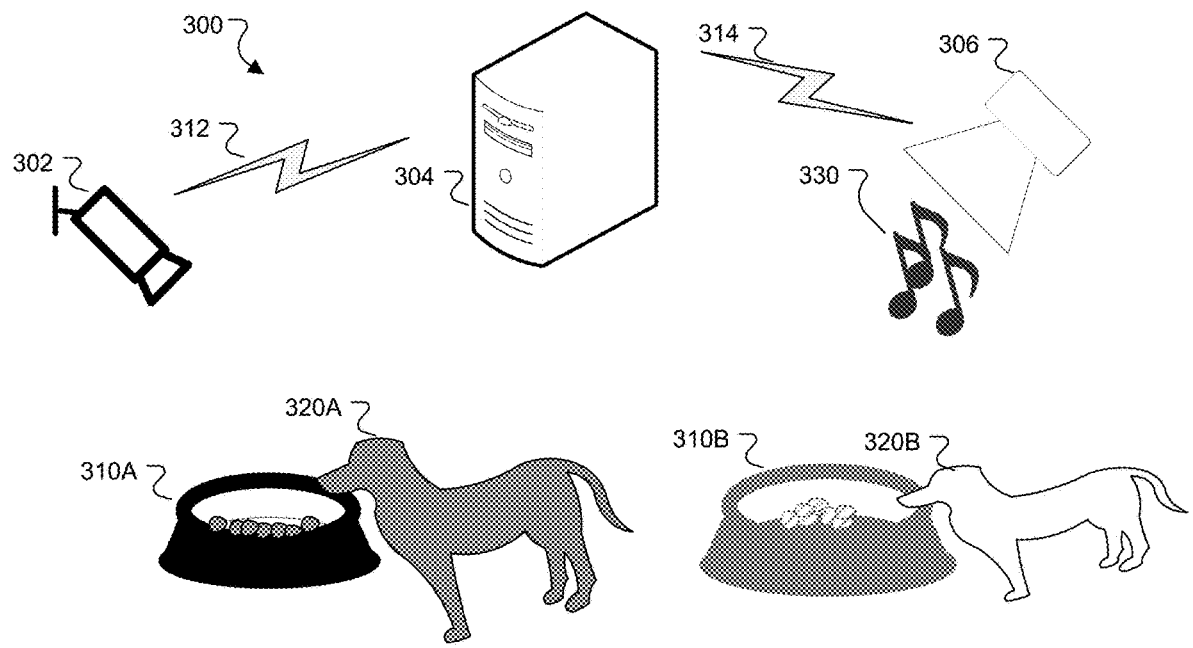
FIGS. 3A and 3B illustrate examples of a system that monitors multiple pets with a camera.
Figure 3B:
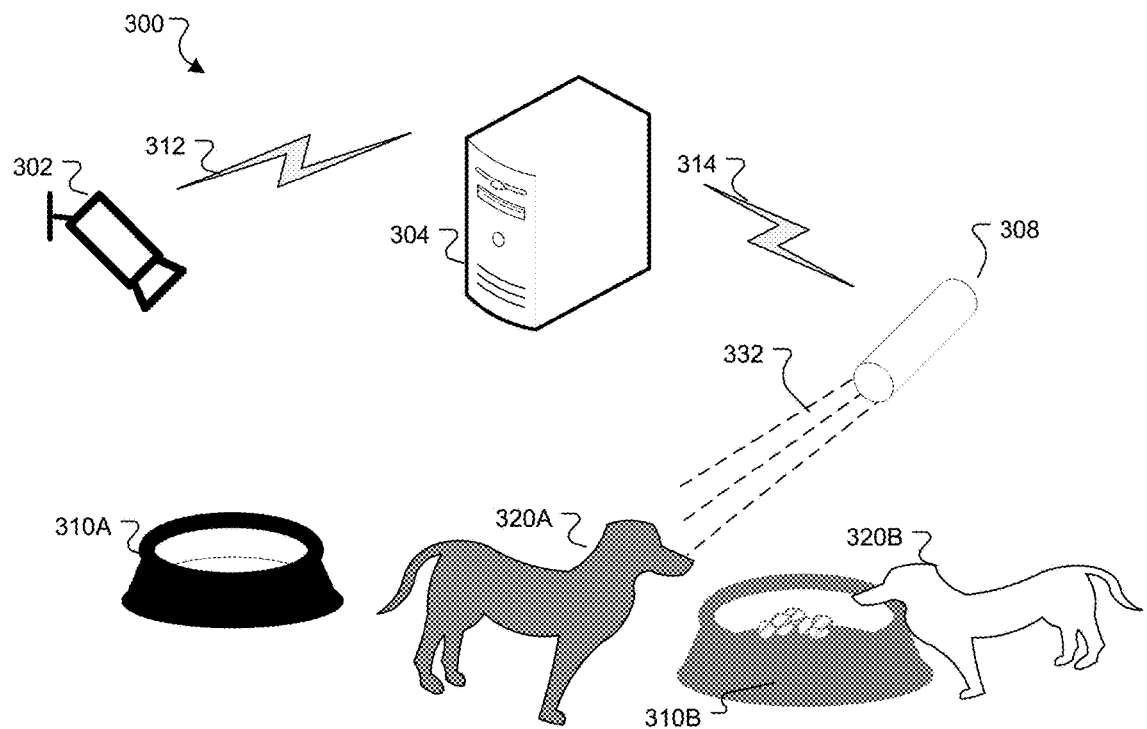

FIGS. 3A and 3B illustrate examples of a monitoring system 300 that monitors multiple pets 320A and 320B. The monitoring system 300 includes a controller 304, one or more cameras 302, and communication links 312. The one or more cameras 302 may correspond to the camera 102 of the example described with FIG. 1, the camera 230 of the example described with FIG. 2, or different types of cameras. Similarly, the controller 304 may correspond to the controller 104 in FIG. 1, the control unit 210 or the servers 260, 270 in FIG. 2, or one or more processors on board of the camera 302. The one or more cameras 302 are configured to capture an image or video of the containers 310A and 310B that are assigned to a first pet 320A and a second pet 320B, respectively. The multiple pets 320A and 320B may be a cat and a dog, or two different dogs, or two different cats, and various other pets. In some implementations, the monitoring system 300 may include an effector 306, 308 that encourages or discourages certain behaviors of the pets 320A and 320B, and communication links 314 that communicates with the controller 304 and the effector 306, 308.

FIG. 3A illustrates an example case where the multiple pets 320A and 320B consume contents from their assigned containers 310A and 310B, respectively. For example, the controller 304 may include assignment information regarding the container 310A corresponding to the first pet 320A (e.g., a dog) that is supposed to eat dog food in the container 310A, and the container 310 corresponding to the second pet 320B (e.g., a cat) that is supposed to eat cat food in the container 310B. In some cases, the user 120 may preset the assignment information. In some cases, the controller 304 may recognize contents in the container 310A and 310B and determine the assignment information based on the contents. The effector 306 may output a sound 330 that encourages the pets 320A and 320B to come to eat their assigned food. The sound may be a favorable music, a sound effect, a complimentary voice of their owner, or other kinds of sound waves (e.g., ultrasonic). The effector 306 may output other types of effects such as lights, smell, etc.

FIG. 3B illustrates an example case where the multiple pets 320A and 320B consume contents from one container 310B, which is assigned to the second pet 320B. For example, the first pet 320A may finish early eating food in the container 310A, and comes to the container 310B to take a portion of food assigned to the second pet 320B. In other cases, the first pet 320A may be interested in other types of food such as food in the container 310B assigned to the second pet 320B. In some examples, the monitoring system 300 may provide a notification to a user or generate a report to notify the user of this event to assist the user in maintaining pets' diet or nutrition. In some implementations, the monitoring system 300 may include an effector 308 (e.g., a deterrent) that discourages certain behaviors of the pets. For example, when the monitoring system 300 detects, based on an image or video from the camera 302, the first pet 320A approaching the container 310B or is located within a range from the container 310B, the monitoring system 300 sends a control signal to the effector 308 over the communication link 314 to cause the effector 308 to output an air jet 332 toward the first pet 320A. The effector 306 may output other type of effects such as lights, sounds, smell, a water spray, a chemical, etc. The sound may be an unfavorable noise, or a voice of its owner, or other kinds of sound waves (e.g., ultrasonic).

Figure 4:
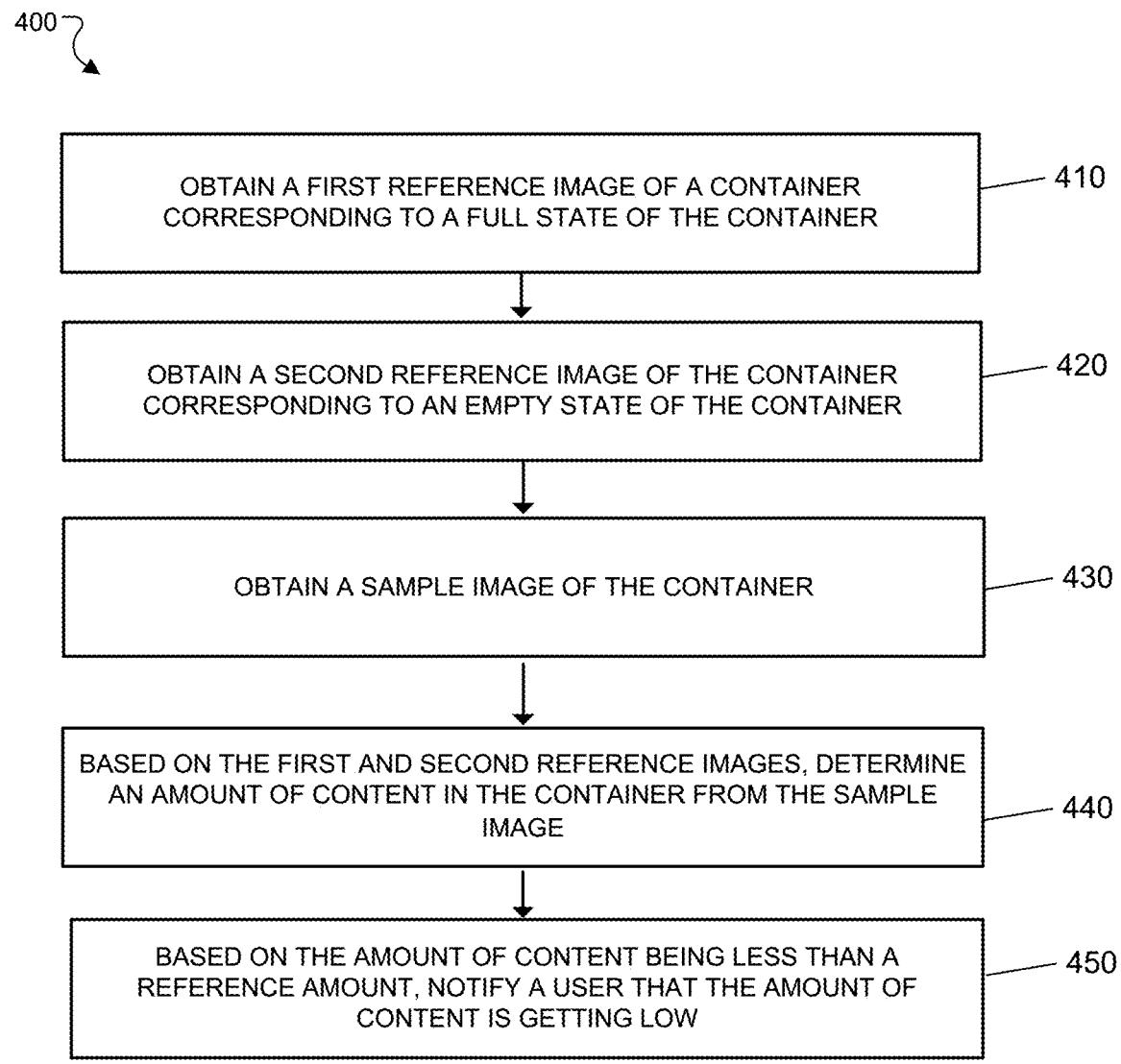
FIG. 4 illustrates an example process for monitoring of pet feeding.

FIG. 4 illustrates an example of a process 400 for determining an amount of content in a monitored container and providing a notification regarding the amount of content. Briefly, the process 400 may include obtaining a first reference image of a container corresponding to a full state of the container (410), obtaining a second reference image of the container corresponding to an empty state of the container (420), obtaining a sample image of the container (430), based on the first and second reference images, determining an amount of content in the container from the sample image (440), and based on the amount of content being less than a threshold amount, notifying a user that the amount of content is getting low (450).

In more detail, the process 400 may include obtaining a first reference image of a container corresponding to a full state of the container (410). For instance, referring to FIG. 1, the controller 104 may obtain, from the camera 102, an image or video of a container 10A when the container 10A is full of pet food 20A, and define the image or video as a first reference image 108A that corresponds to a full state of the container 10A. In some examples, the first reference image 108A may be obtained when a user installs the system 100 or configures settings of the system 100. For example, the system 100 (e.g., controller 104) may guide the user to fill up the container 10A with pet food 20A and place the container 10A in an area 106 that is within a field of view of the camera 102. Then the system 100 may capture an image of the container 10A and defines the image as the first reference image 108A. Similarly, the user may repeat this process for other containers such as the container 10B for content 20B (e.g., water) to define a first reference image 108C for the container 10B. In some examples, the system 100 obtains a single image that includes multiple containers 10A and 10B that are full of contents 20A and 20B, respectively, and defines a first reference image for each container based on the single image.

The process 400 may include obtaining a second reference image of the container corresponding to an empty state of the container (420). For instance, referring to FIG. 1, the controller 104 may obtain, from the camera 102, an image or video of a container 10A when the container 10A is absent of pet food 20A, and define the image or video as a second reference image 108B that corresponds to an empty state of the container 10A. In some examples, the second reference image 108B may be obtained when a user installs the system 100 or configures settings of the system 100. For example, the system 100 (e.g., controller 104) may guide the user to remove the content 20A from the container 10A or place an empty container 10A in an area 106 that is within a field of view of the camera 102. Then the system 100 may capture an image of the container 10A and defines the image as the second reference image 108B.

Similarly, the user may repeat this process for other containers such as the container 10B for the content 20B (e.g., water) to define a second reference image 108D for the container 10B. In some cases where the containers 10A and 10B have the same shape, the system 100 may utilize the second reference image of the container 10A as a second reference image of the container 10B since the empty state of the containers 10A and 10B may appear to be the same. In some examples, the system 100 obtains a single image that includes multiple containers 10A and 10B that are empty, and defines a second reference image for each container based on the single image.

The process 400 may include obtaining a sample image of the container (430). For instance, the controller 104 may obtain a sample image 110 (e.g., a current image) of the containers 10A, 10B, or both as the camera 102 captures the image 110. In some examples, the camera 102 may continuously capture images or video, and the controller 104 may trigger transmission of images based on an event or based on a time interval. For instance, the controller 104 may retrieve images from the camera 102 in the morning (e.g., 6 AM, 7 AM, etc.) to check a current state of the containers 10A and 10B. In some cases, the controller 104 may retrieve the images 110 from the camera 102 based on an event such as a detection of a pet eating food from the container 10A or drinking water from the container 10B to check the status of the containers 10A and 10B after the event.

The process 400 may include determining, based on the first and second reference images, an amount of content in the container from the sample image (440). For instance, the controller 104 may determine an amount of content 20A and 20B based on a level of food or water in the respective containers 10A and 10B. For instance, the level of water in the container 10B in the image 110 may correspond to a water level in one of the reference images 108C or 108D, or a water level between the water levels of the reference images 108C and 108D. In some examples, the controller 104 may determine an amount of content 20A or 20B based on an image contrast value of the sample image with respect to contrast values of the first reference image and the second reference image.

In some examples, alternatively or in addition, the controller 104 may determine an amount of content 20A or 20B based on predetermined information regarding the container 10. For example, the controller 104 may include information such as a volume, shape, or appearance of the container 10. In some cases, the container 10 may have fiducial markers on an inner surface of the container which indicate the amount of content 20A or 20B remaining in the container 10. In some examples where an upper surface of content 20A or 20B does not correspond to a single fiducial marker, the controller 104 may determine the amount of content 20A or 20B based on a maximum fiducial marker reading, a minimum fiducial marker reading, or an average of the maximum and the minimum fiducial marker readings.

The process 400 may include notifying, based on the amount of content being less than a reference amount, a user that the amount of content is getting low (450). For instance, the controller 104 may include a preset rule associated with a remaining amount of content 20 in the container 10. The rule may be configured differently for each container 10A and 10B. For example, the controller 104 may send an instant message to the user 120 based on a determination that a water level is less than or equal to 20% of the full state of the container 10B or that a food level is less than 10% of the full state of the container 10A.

In some implementations, the process 400 may include obtaining additional information such as an image of a pet, a breed of the pet, a size of the pet, a weight of the pet, an age of the pet, a color of the pet, a capacity of the container, etc., during an initial setup of the system or at an introduction of a new pet or container. In some examples, some of the additional information such as the age, the size, the weight, and the color of the pet may be updated as the pet grows. The system 100 may, based on the additional information as well as analysis of images captured by the camera 102, identify the pet, determine a proper feeding amount for the pet, or determine whether a consumption pattern of the pet is normal. The system 100 may provide a report including information related to pet health and nutrition with the additional information. For example, the system 100 may report that a monitored dog is overfed as the dog eats more than 2 cups of dog food a day while a normal dog that weighs about 10 lb. generally eats ¾ cups to 1 cup of dog food a day based on breed information. The breed information may include an average feeding amount of one or more pets.

Figure 5A:
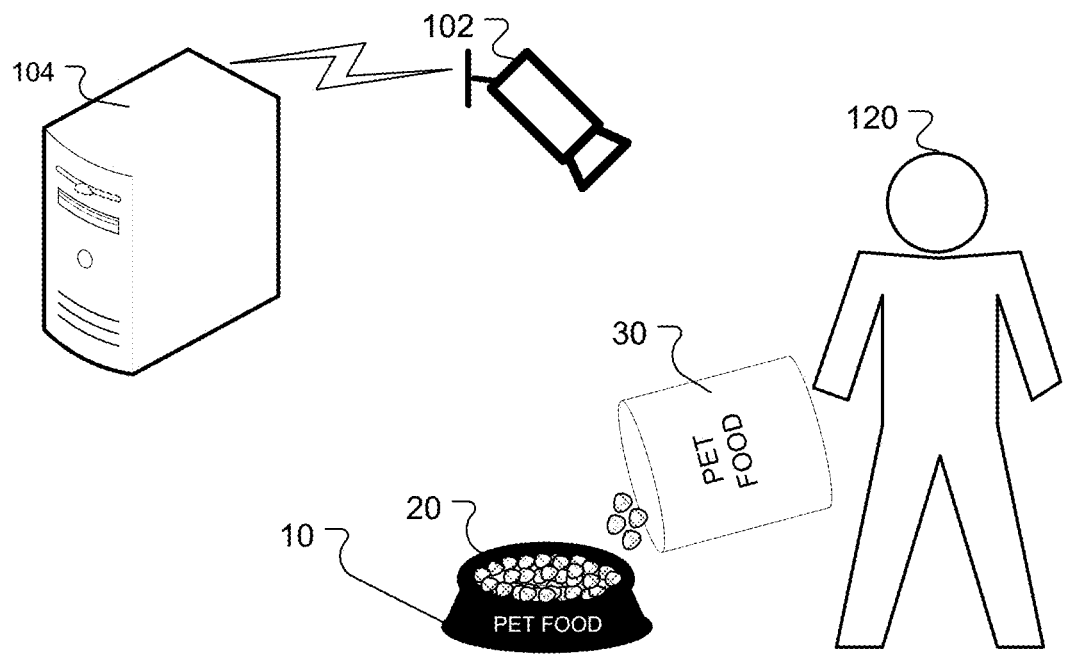
FIGS. 5A and 5B illustrate examples of obtaining a video of a user filling a container and a video of a pet leaving an empty container.
Figure 5B:
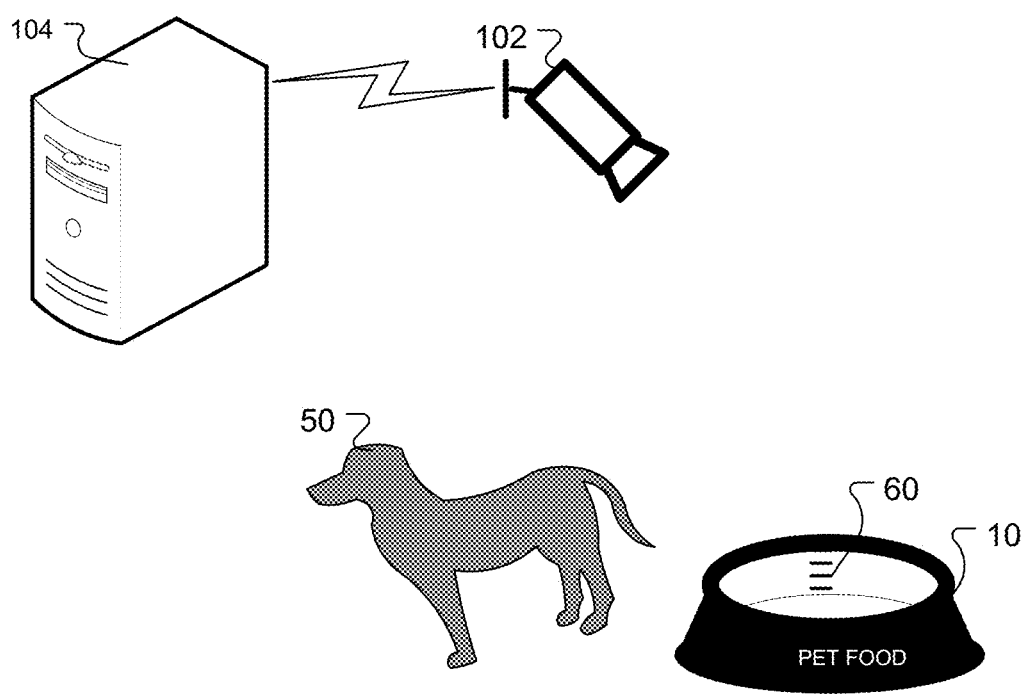

FIGS. 5A and 5B illustrate examples of obtaining a video of a user filling a container and a video of a pet leaving an empty container, respectively. For example, as described above in FIG. 1, a property includes a camera 102 that is configured to capture images and videos of an area of the property and a controller 104 that is configured to communicate with the camera 102 and process the images and videos captured by the camera 102.

The camera 102 may monitor a range (e.g., 1 m, 2 m, 3 m, etc.) from a container 10, and capture videos of a user 120 or a pet 50 located within the range. Based on the videos, the controller 104 may determine whether the user 120 approaches the container 10 or leaves the container 10. For example, the controller 104 may utilize a change of distances between the user 120 and the container 10 in frames of the video of the user 120 to determine whether the user 120 approaches or leaves the container 10. In similar ways, the controller 104 may determine whether that the pet 50 approaches or leaves the container 10 based on the video of the pet 50.

In some examples, the controller 104 may determine actions of the user 120 and the pet 50 based on the videos captured by the camera 102. For example, the controller 104 may determine that the user 120 approaches and leaves the container 10 with a bag 30 including pet food or a bottle of water based on the video of the user 120. In another, the controller 104 may determine, based on the video of the pet 50, whether the pet 50 is consuming (e.g., eating or drinking) a content 20 (e.g., pet food or water) or leaves the container 10 without consuming the content 20. The controller 104 may control the camera 102 to capture an image of the container 10 based on the determined actions of the user 120 or the pet 50. For instance, the controller 104 may control the camera 102 to capture a first image of the container 10 based on a determination that the user 120 has finished filling the container 10. The controller 104 may control the camera 102 to capture a second image of the container 10 based on a determination that the pet 50 has finished consuming the content 20 in the container 10.

Alternatively or in addition, the container 10 may include fiducial markers 60 that are defined at a surface of the container 10 and that indicate levels of the content 20 with respect to a bottom surface of the container 10. For example, the controller 104 may determine a first reference level among the fiducial markers 60 shown in the first image (e.g., 108A in FIG. 1) corresponding to a full state of the container 10 with respect to the bottom surface of the container 10, and a second reference level among the fiducial markers 60 shown in the second image (e.g., 108B in FIG. 1) corresponding to an empty state of the container 10 with respect to the bottom surface of the container 10. In addition, the controller 104 may determine a level of the content in the container 10 show in a sample image of the container 10 relative to at least one of the first reference level or the second reference level.

In some cases, the controller 104 may determine the full state of the container 10 based on the first image showing less than a first threshold number of fiducial markers, and determine the empty state of the container 10 based on the second image showing more than a second threshold number of fiducial markers. For instance, the controller 104 may determine a full state of the container 10 when one or no fiducial marker is visible in an image of the container 10, and determine an empty state of the container 10 when five or more fiducial markers are visible in an image of the container 10.

Figure 6:
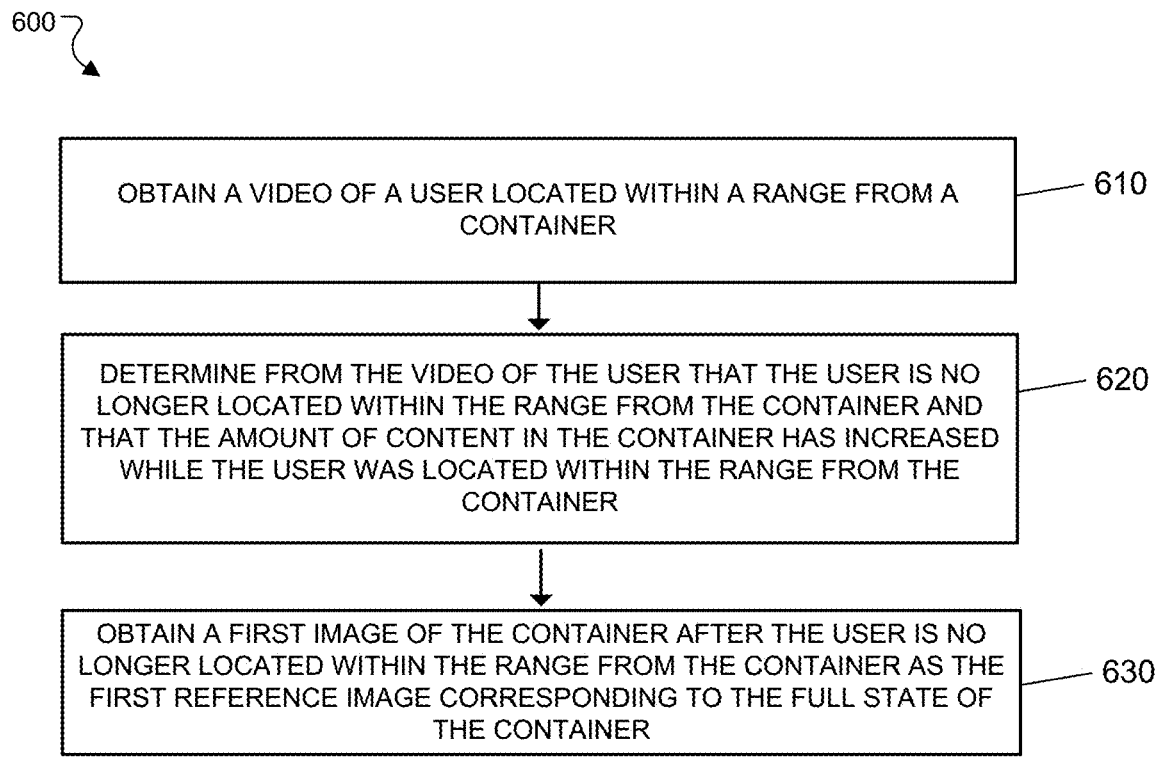
FIG. 6 illustrates an example process for determining a reference image corresponding to a full state of a container.

FIG. 6 illustrates an example process for determining a reference image corresponding to a full state of a container. Briefly, a process 600 may include obtaining a video of a user that is located within a range from the container (610), determining from the video of the user that the user is no longer located within the range from the container and that the amount of content in the container has increased while the user was located within the range from the container (620), and in response to determining that the user is no longer located within the range from the container and that the amount of content in the container has increased while the user was located within the range from the container, obtaining a first image of the container after the user is no longer located within the range from the container as the first reference image corresponding to the full state of the container (630).

In more detail, the process 600 may include obtaining a video of a user that is located within a range from the container (610). For example, as described above referring to FIG. 5A, the controller 104 may obtain a video of the user 120 that is located within a range from the container 10. In some cases, the camera 102 may continuously monitor a monitoring range of the camera 102 which the user 120 may pre-set to include the container 10 or may correspond to a pan and tilt range of the camera 102. In some cases, the controller 104 may receive a signal from a sensor (e.g., a proximity sensor) to determine that the user 120 is located within the range from the container 10 and control the camera 102 to capture a video of the user 120 based on the signal from the sensor.

The process 600 may include determining from the video of the user that the user is no longer located within the range from the container and that the amount of content in the container has increased while the user was located within the range from the container (620). For instance, the controller 104 may determine distances between the user 120 and the container 10 based on frames of the video of the user 120. The controller 104 may then determine that the user 120 approaches the container 10 based on a decrease of the distances over time, and determine that the user 120 leaves the container 10 based on an increase of the distances over time.

In some examples, the controller 104 may also detect the bag 30 carried by the user 120, and determine that the amount of content in the container 10 has increased based on a detection that the user 120 approached the container 10 and filled the container 10 with the content 20 in the bag 30. In some cases, the controller 104 may determine that the amount of content in the container 10 has increased based on a detection that the user 120 took away the container 10 and replaced the container 10. The controller 104 may determine that the user 120 has finished filling the container 10 based on a determination that the user 120 moves outside of the range from the container 10. In some implementations, the controller 104 may have been trained to identify a filling motion of the user 120 based on prior videos of the user 120, and determine that the amount of content in the container 10 has increased while the user 120 was located within the range from the container 10. In some implementations, the controller 104 may be configured to determine a change of the amount of content in the container 10 based on a contrast change of frames of the video of the container 10.

The process 600 may include, in response to determining that the user is no longer located within the range from the container and that the amount of content in the container has increased while the user was located within the range from the container, obtaining a first image of the container after the user is no longer located within the range from the container as the first reference image corresponding to the full state of the container (630). For example, the controller 104 may control the camera 102 to capture a first image of the container 10 based on the determination that the user 120 is no longer located within the range after filling the container 10. In some examples, the controller 104 may obtain the first image of the container 10 by selecting a frame of the video including the container 10 corresponding to a time instant of a completion of filling of the container 10, for example, when the user 120 is outside of the range from the container 10.

The controller 104 may determine the first image as a first reference image (e.g., 108A in FIG. 1) corresponding to a full state of the container 10. In some examples, the controller 104 may store the first reference image in a non-transitory memory device. The controller 104 may compare the first reference image with a sample image of the container 10 to determine an amount of content corresponding to the sample image as described above with regard to the process 400.

Figure 7:
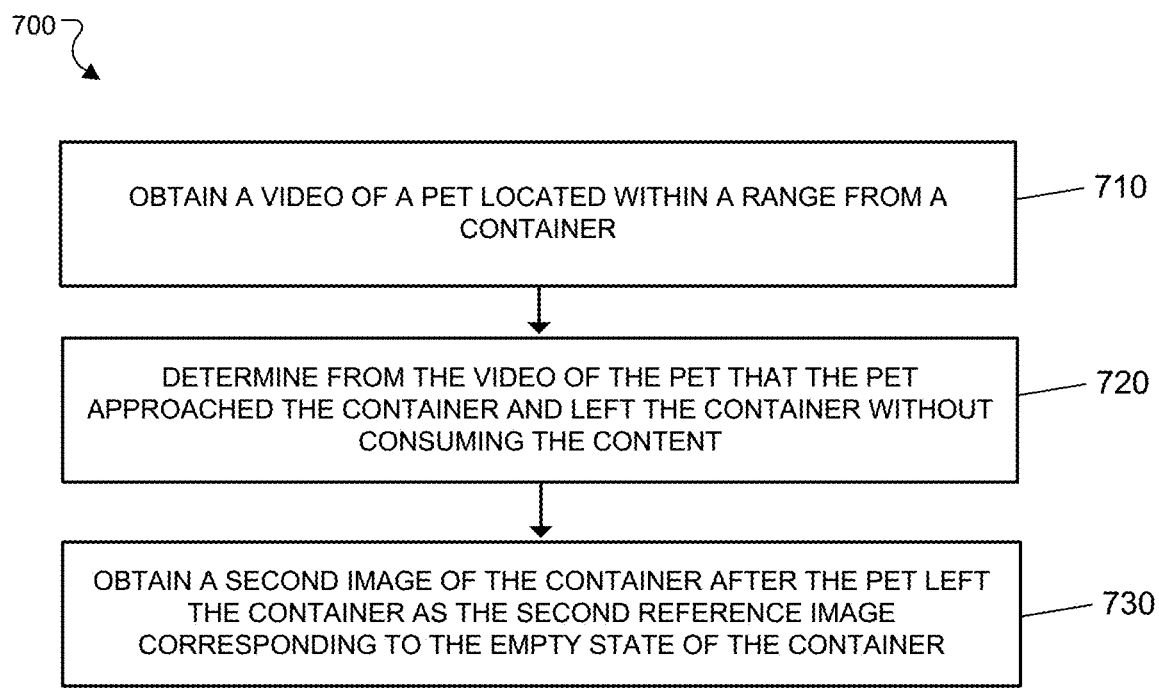
FIG. 7 illustrates an example process for determining a reference image corresponding to an empty state of a container.

FIG. 7 illustrates an example process for determining a reference image corresponding to an empty state of a container. Briefly, a process 700 may include obtaining a video of a pet located within a range from a container (710), determining from the video of the pet that the pet approached the container and left the container without consuming the content (720), in response to determining that the pet approached the container and left the container without consuming the content, obtaining a second image of the container after the pet left the container as the second reference image corresponding to the empty state of the container (730).

In more detail, the process 700 may include obtaining a video of a pet located within a range from a container (710). For example, as described above referring to FIG. 5B, the controller 104 may obtain a video of the pet 50 that is located within a range from the container 10. In some cases, the camera 102 may continuously monitor a monitoring range of the camera 102 which the user 120 may pre-set to include the container 10 or may correspond to a pan and tilt range of the camera 102. In some cases, the controller 104 may receive a signal from a sensor (e.g., a proximity sensor) to determine that the pet 50 is located within the range from the container 10 and control the camera 102 to capture a video of the pet 50 based on the signal from the sensor.

The process 700 may include determining from the video of the pet that the pet approached the container and left the container without consuming the content (720). For instance, the controller 104 may determine distances between the pet 50 and the container 10 based on frames of the video of the pet 50. The controller 104 may then determine that the pet 50 approached the container 10 based on a decrease of the distances over time, and determine that the pet 50 left the container 10 based on an increase of the distances over time. In some cases, the controller 104 may determine whether the pet 50 consumes content in the container 10 based on a motion of the pet 50 or a duration of the pet 50 staying at the container 10. For example, the controller 104 may have been trained to identify an eating motion of the pet 50 based on prior images or videos of the pet 50 or other pets. In another, the controller 104 may determine that the pet 50 left the container without consuming the content if the pet 50 stayed at the container 10 for a duration that is less than a threshold time (e.g., 5 secs).

The process 700 may include in response to determining that the pet approached the container and left the container without consuming the content, obtaining a second image of the container after the pet left the container as the second reference image corresponding to the empty state of the container (730). For example, the controller 104 may control the camera 102 to capture a second image of the container 10 based on a determination that the pet 50 has left the container 10 without consuming the content. In some examples, the controller 104 may obtain the second image of the container 10 by selecting a frame of the video including the container 10 corresponding to a time instant of a departure of the pet 50 from the container 10, for example, when the pet 50 is no longer located within the range from the container 10.

The controller 104 may determine the second image as a second reference image (e.g., 108B in FIG. 1) corresponding to an empty state of the container 10. In some examples, the controller 104 may store the second reference image in a non-transitory memory device. The controller 104 may compare the second reference image with a sample image of the container 10 to determine an amount of content corresponding to the sample image as described above with regard to the process 400. In some examples, the controller 104 may utilize both of the first reference image and the second reference image to determine the amount of content corresponding to the sample image.

Figure 8:
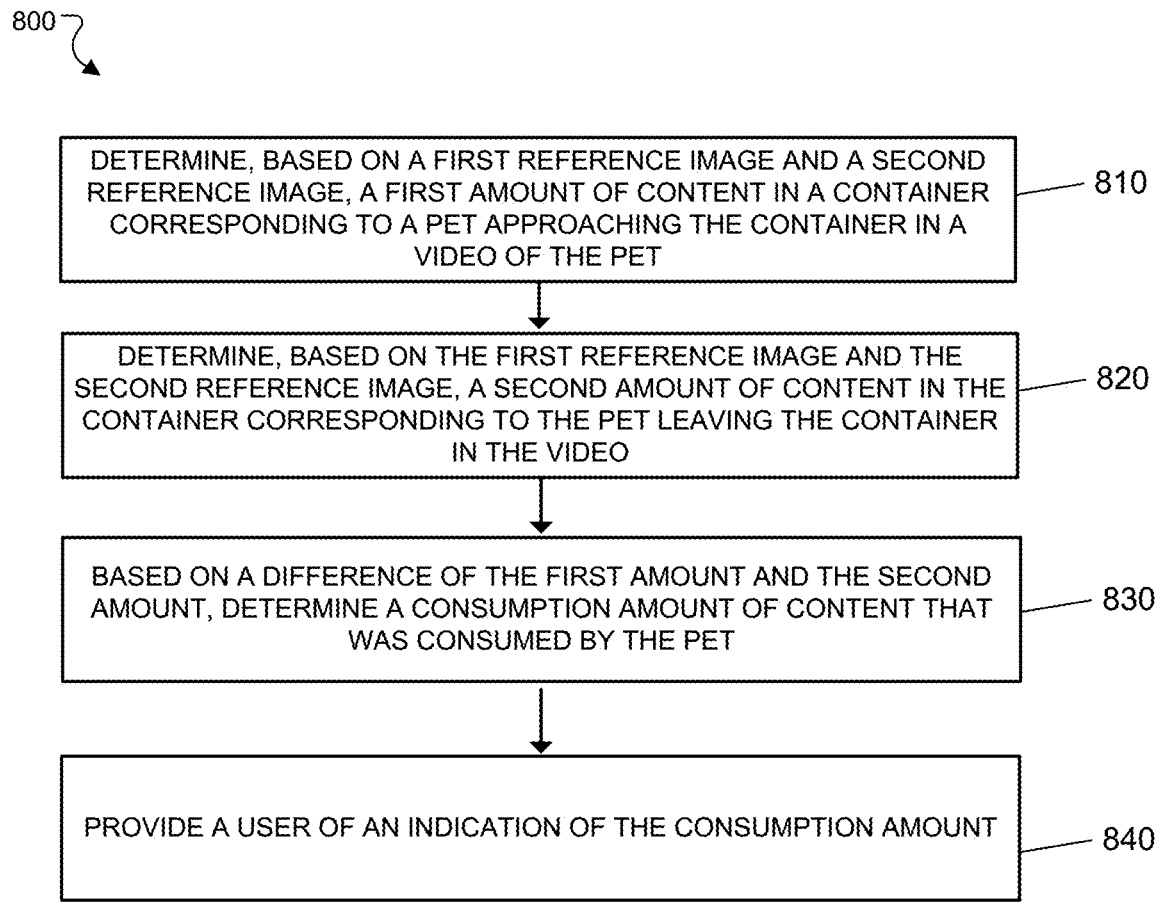
FIG. 8 illustrates an example process for determining an amount of content consumed by a pet based on reference images.

FIG. 8 illustrates an example process for determining an amount of content consumed by a pet based on reference images. Briefly, a process 800 may include determining, based on a first reference image and a second reference image, a first amount of content in a container corresponding to a pet approaching the container in a video of the pet (810), determining, based on the first reference image and the second reference image, a second amount of content in the container corresponding to the pet leaving the container in the video (820), based on a difference of the first amount and the second amount, determining a consumption amount of content that was consumed by the pet (830), and providing the user of an indication of the consumption amount (840).

In detail, the process 800 may include determining, based on a first reference image and a second reference image, a first amount of content in a container corresponding to a pet approaching the container in a video of the pet (810) and determining, based on the first reference image and the second reference image, a second amount of content in the container corresponding to the pet leaving the container in the video (820). For example, the first reference image may include images 108A and 108C (see FIG. 1) corresponding to a full state of the container 10, and the second reference image may include images 108B and 108D (see FIG. 1) corresponding to an empty state of the container 10.

Further, the controller 104 may determine actions of the pet 50 such as approaching the container 10, leaving the container 10, and eating or drinking contents in the container 10. The controller 104 may control the camera 102 to capture a first sample image based on a detection of the pet 50 approaching the container 10 and capture a second sample image based on a detection of the pet 50 leaving the container 10 after eating the content 20 in the container 10. The controller 104 then determine, based on the first reference image and the second reference image, a first amount of content corresponding to the first sample image and a second amount of content corresponding to the second sample image.

The process 800 may include determining a consumption amount of content that was consumed by the pet based on a difference between the first amount and the second amount (830). For example, the controller 104 may determine the consumption amount by subtracting the second amount from the first amount to determine the difference between the first amount and the second amount.

In some implementations, referring to FIG. 1, the system 100 may remind the user 120 to pick up perishable food such as wet food or raw food if it is not consumed within a certain time from when it is placed in the feeding area 106. For example, the system 100 may track the amount of content in the container 10 over time, and send a notification to the user 120 if the amount of content in the container 10 does not decrease below a threshold amount within a predetermined time. In some cases, the predetermined time may be determined based on a type of content in the container 10.

In some implementations, the system 100 may recognize a type of food that is dispensed to the container 10. For instance, the user 130 may show a food bag or its barcode to the camera 102 in order to log what sort of food is being dispensed. In some cases, the system 100 may recognize the type of food from an image of the content 20 in the container 10. In another, the system 100 may generate a log or a database that records types of food dispensed to the container 10, dispensing times, and a consumption amount of each type of food. For example, if the user 120 is trying out different pet foods, the system 100 may produce an automatic log of what is dispensed and how much is eaten each day. In some cases, the system 100 may notify the user 120 if the user 120 is trying to dispense a new type of pet food.

The process 800 may include determining providing the user of an indication of the consumption amount (840). For example, the controller 104 may notify the user 120 of a consumption pattern that includes at least one of a number of visits that the pet approached and left the container, a consumption amount for each visit, a consumption duration for each visit, or a consumption speed corresponding to a ratio of the consumption amount to the consumption duration for each visit. In some examples, the controller 104 may send a report including the consumption pattern to the user 120 via an email, an instant message, or a call, or may update a website or a native application that is associated with the monitoring system 100 (see FIG. 1).

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining a first reference image of a container corresponding to a full state of the container;
obtaining a second reference image of the container corresponding to an empty state of the container;
obtaining a sample image of the container;
based on the first and second reference images, determining an amount of content in the container from the sample image;
based on the amount of the content being less than a reference amount, notifying a user that the amount of the content is getting low;
obtaining a video of a pet that is located within a range from the container;
determining from the video of the pet that the pet approached the container and left the container without consuming the content; and
in response to determining that the pet approached the container and left the container without consuming the content, obtaining a second image of the container after the pet left the container as the second reference image corresponding to the empty state of the container.

2. The method of claim 1, further comprising:
obtaining a video of the user that is located within the range from the container;
determining from the video of the user that the user is no longer located within the range from the container and that the amount of content in the container has increased while the user was located within the range from the container; and
in response to determining that the user is no longer located within the range from the container and that the amount of content in the container has increased while the user was located within the range from the container, obtaining a first image of the container after the user is no longer located within the range from the container as the first reference image corresponding to the full state of the container.

3. The method of claim 1, wherein determining the amount of the content in the container from the sample image comprises:
based on the first reference image, determining a first reference level of the content corresponding to the full state of the container with respect to a bottom surface of the container;
based on the second reference image, determining a second reference level of the content corresponding to the empty state of the container with respect to the bottom surface of the container; and
based on the sample image, determining a level of the content in the container relative to at least one of the first reference level or the second reference level.

4. The method of claim 3, wherein determining the first reference level of the content comprises determining a first fiducial marker among a plurality of fiducial markers of the container that are defined at a side surface of the container,
wherein determining the second reference level of the content comprises determining a second fiducial marker among the plurality of fiducial markers of the container, and
wherein determining the level of the content in the container comprises determining a fiducial mark among the plurality of fiducial markers between the first fiducial marker and the second fiducial marker.

5. The method of claim 1, wherein determining the amount of the content in the container from the sample image comprises:
comparing a contrast value of the sample image to a reference contrast value of at least one of the first reference image or the second reference image; and
determining the amount of the content in the container based on the comparison of the contrast value of the sample image to the reference contrast value of at least one of the first reference image or the second reference image.

6. The method of claim 1, further comprising:
determining, based on the first reference image and the second reference image, a first amount of content in the container corresponding to the pet approaching the container in the video;
determining, based on the first reference image and the second reference image, a second amount of content in the container corresponding to the pet leaving the container in the video;
based on a difference of the first amount and the second amount, determining a consumption amount of content that was consumed by the pet; and
providing the user of an indication of the consumption amount.

7. The method of claim 6, wherein providing the user of the indication of the consumption amount compresses:
notifying the user of a consumption pattern comprising at least one of a number of visits that the pet approached and left the container, a consumption amount for each visit, a consumption duration for each visit, or a consumption speed corresponding to a ratio of the consumption amount to the consumption duration for each visit.

8. The method of claim 6, further comprising:
obtaining breed information including an average feeding amount of the pet;
comparing the consumption amount with the average feeding amount; and
providing the user with the consumption amount based on the consumption amount being outside of a preset range from the average feeding amount.

9. The method of claim 7, further comprising:
based on the consumption pattern and the amount of the content in the container, determining a feeding schedule including a period of time to fill the container to the full state with water or pet food; and
based on the feeding schedule, providing the user with an estimated time at which the container is predicted to become less than the reference amount.

10. The method of claim 1, further comprising:
obtaining assignment information regarding a first container corresponding to a first pet and a second container corresponding to a second pet;
obtaining a video of the first pet and the second pet that are located within the range from the first container and the second container, respectively; and based on the video of the first pet and the second pet, determining whether the first pet consumes a first content in the first container and the second pet consumes a second content in the second container according the assignment information.

11. The method of claim 10, further comprising:
based on a determination that the second pet is positioned within the range from the first container or a determination that the second pet consumes the first content in the first container, activating a sound device, a lighting device, or a sprayer to discourage the second pet from consuming the first content in the first container.

12. The method of claim 1, further comprising:
obtaining weight information including at least one of a weight of the container or a weight of the pet that is located within the range from the container;
based on a change of the weight information, determining a weight of content that was consumed by the pet; and
determining whether the weight of content corresponds to the amount of content determined from the sample image.

13. A monitoring system for pet feeding, comprising:
a camera disposed at a property and configured to capture a image or video of one or more areas of the property; and
one or more controller configured to perform operations comprising:
  obtaining a first reference image of a container corresponding to a full state of the container,
  obtaining a second reference image of the container corresponding to an empty state of the container,
  obtaining a sample image of the container,
  based on the first and second reference images, determining an amount of content in the container from the sample image,
  based on the amount of the content being less than a reference amount, notifying a user that the amount of the content is getting low,
  obtaining a video of a pet that is located within a range from the container,
  determining from the video of the pet that the pet approached the container and left the container without consuming the content, and
  in response to determining that the pet approached the container and left the container without consuming the content, obtaining a second image of the container after the pet left the container as the second reference image corresponding to the empty state of the container.

14. The system of claim 13, wherein the operations further comprise:
obtaining a video of the user that is located within the range from the container;
determining from the video of the user that the user is no longer located within the range from the container and that the amount of content in the container has increased while the user was located within the range from the container; and
in response to determining that the user is no longer located within the range from the container and that the amount of content in the container has increased while the user was located within the range from the container, obtaining a first image of the container after the user is no longer located within the range from the container as the first reference image corresponding to the full state of the container.

15. The system of claim 13, further comprising:
a weight sensor configured to measure at least one of a weight of the container or a weight of the pet that is located within the range from the container, wherein the operations further comprise:
  obtaining weight information including at least one of the weight of the container or the weight of the pet that is located within the range from the container,
  based on a change of the weight information, determining a weight of content that was consumed by the pet, and
  determining whether the weight of content corresponds to the amount of content determined from the sample image.

16. At least one non-transitory computer-readable storage medium having stored thereon instructions which, when executed by at least one processor, cause performance of operations comprising:
obtaining a first reference image of a container corresponding to a full state of the container;
obtaining a second reference image of the container corresponding to an empty state of the container;
obtaining a sample image of the container;
based on the first and second reference images, determining an amount of content in the container from the sample image;
based on the amount of the content being less than a reference amount, notifying a user that the amount of the content is getting low;
obtaining a video of a pet that is located within a range from the container;
determining from the video of the pet that the pet approached the container and left the container without consuming the content; and
in response to determining that the pet approached the container and left the container without consuming the content, obtaining a second image of the container after the pet left the container as the second reference image corresponding to the empty state of the container.

17. The at least one non-transitory computer-readable storage medium of claim 16, wherein the operations comprise:
obtaining a video of the user that is located within the range from the container;
determining from the video of the user that the user is no longer located within the range from the container and that the amount of content in the container has increased while the user was located within the range from the container; and
in response to determining that the user is no longer located within the range from the container and that the amount of content in the container has increased while the user was located within the range from the container, obtaining a first image of the container after the user is no longer located within the range from the container as the first reference image corresponding to the full state of the container.

18. A computer-implemented method comprising:
obtaining a first reference image of a container corresponding to a full state of the container;
obtaining a second reference image of the container corresponding to an empty state of the container;
obtaining a sample image of the container;
based on the first and second reference images, determining an amount of content in the container from the sample image;

based on the amount of the content being less than a reference amount, notifying a user that the amount of the content is getting low;
obtaining a video of the user that is located within a range from the container;
determining from the video of the user that the user is no longer located within the range from the container and that the amount of content in the container has increased while the user was located within the range from the container; and
in response to determining that the user is no longer located within the range from the container and that the amount of content in the container has increased while the user was located within the range from the container, obtaining a first image of the container after the user is no longer located within the range from the container as the first reference image corresponding to the full state of the container.

19. A monitoring system for pet feeding, comprising:
a camera disposed at a property and configured to capture a image or video of one or more areas of the property; and
one or more controller configured to perform operations comprising:
   obtaining a first reference image of a container corresponding to a full state of the container,
   obtaining a second reference image of the container corresponding to an empty state of the container,
   obtaining a sample image of the container,
   based on the first and second reference images, determining an amount of content in the container from the sample image,
   based on the amount of the content being less than a reference amount, notifying a user that the amount of the content is getting low,
   obtaining a video of the user that is located within a range from the container;
   determining from the video of the user that the user is no longer located within the range from the container and that the amount of content in the container has increased while the user was located within the range from the container; and
   in response to determining that the user is no longer located within the range from the container and that the amount of content in the container has increased while the user was located within the range from the container, obtaining a first image of the container after the user is no longer located within the range from the container as the first reference image corresponding to the full state of the container.

20. At least one non-transitory computer-readable storage medium having stored thereon instructions which, when executed by at least one processor, cause performance of operations comprising:
   obtaining a first reference image of a container corresponding to a full state of the container;
   obtaining a second reference image of the container corresponding to an empty state of the container;
   obtaining a sample image of the container;
   based on the first and second reference images, determining an amount of content in the container from the sample image;
   based on the amount of the content being less than a reference amount, notifying a user that the amount of the content is getting low;
   obtaining a video of the user that is located within a range from the container;
   determining from the video of the user that the user is no longer located within the range from the container and that the amount of content in the container has increased while the user was located within the range from the container; and
   in response to determining that the user is no longer located within the range from the container and that the amount of content in the container has increased while the user was located within the range from the container, obtaining a first image of the container after the user is no longer located within the range from the container as the first reference image corresponding to the full state of the container.

21. A computer-implemented method comprising:
   obtaining a first reference image of a container corresponding to a full state of the container;
   obtaining a second reference image of the container corresponding to an empty state of the container;
   obtaining a sample image of the container;
   based on the first and second reference images, determining an amount of content in the container from the sample image;
   based on the amount of the content being less than a reference amount, notifying a user that the amount of the content is getting low;
   obtaining assignment information regarding a first container corresponding to a first pet and a second container corresponding to a second pet;
   obtaining a video of the first pet and the second pet that are located within a range from the first container and the second container, respectively; and
   based on the video of the first pet and the second pet, determining whether the first pet consumes a first content in the first container and the second pet consumes a second content in the second container according the assignment information.

22. The method of claim 21, further comprising:
   based on a determination that the second pet is positioned within the range from the first container or a determination that the second pet consumes the first content in the first container, activating a sound device, a lighting device, or a sprayer to discourage the second pet from consuming the first content in the first container.

23. A monitoring system for pet feeding, comprising:
a camera disposed at a property and configured to capture a image or video of one or more areas of the property; and
one or more controller configured to perform operations comprising:
   obtaining a first reference image of a container corresponding to a full state of the container,
   obtaining a second reference image of the container corresponding to an empty state of the container,
   obtaining a sample image of the container,
   based on the first and second reference images, determining an amount of content in the container from the sample image,
   based on the amount of the content being less than a reference amount, notifying a user that the amount of the content is getting low,
   obtaining assignment information regarding a first container corresponding to a first pet and a second container corresponding to a second pet,
   obtaining a video of the first pet and the second pet that are located within a range from the first container and the second container, respectively, and based on the video of the first pet and the second pet, determining whether the first pet consumes a first content in the first container and the second pet consumes a second content in the second container according the assignment information.

24. The system of claim 23, wherein the operations further comprises:

based on a determination that the second pet is positioned within the range from the first container or a determination that the second pet consumes the first content in the first container, activating a sound device, a lighting device, or a sprayer to discourage the second pet from consuming the first content in the first container.

25. At least one non-transitory computer-readable storage medium having stored thereon instructions which, when executed by at least one processor, cause performance of operations comprising:

obtaining a first reference image of a container corresponding to a full state of the container;

obtaining a second reference image of the container corresponding to an empty state of the container;

obtaining a sample image of the container;

based on the first and second reference images, determining an amount of content in the container from the sample image;

based on the amount of the content being less than a reference amount, notifying a user that the amount of the content is getting low;

obtaining assignment information regarding a first container corresponding to a first pet and a second container corresponding to a second pet;

obtaining a video of the first pet and the second pet that are located within a range from the first container and the second container, respectively; and based on the video of the first pet and the second pet, determining whether the first pet consumes a first content in the first container and the second pet consumes a second content in the second container according the assignment information.

26. The at least one non-transitory computer-readable storage medium of claim 25, wherein the operations further comprise:

based on a determination that the second pet is positioned within the range from the first container or a determination that the second pet consumes the first content in the first container, activating a sound device, a lighting device, or a sprayer to discourage the second pet from consuming the first content in the first container.

* * * * *